United States Patent [19]

Ohta et al.

[11] Patent Number: 5,117,415
[45] Date of Patent: May 26, 1992

[54] OPTICAL CARD, A CARD HOLDER AND AN APPARATUS FOR RECORDING, REPRODUCING AND ERASING INFORMATION ON AND FROM THE OPTICAL CARD

[75] Inventors: Kenji Ohta; Hiroyuki Katayama; Junichiro Nakayama, all of Nara; Kazuhiro Kimura, Hyogo; Hirotsugu Matoba; Shozo Kobayashi, both of Nara, all of Japan

[73] Assignee: Sharp Kabushiki Kaisha, Osaka, Japan

[21] Appl. No.: 735,685

[22] Filed: Jul. 29, 1991

Related U.S. Application Data

[63] Continuation of Ser. No. 340,756, Apr. 20, 1989, abandoned.

[30] Foreign Application Priority Data

Apr. 20, 1988 [JP] Japan ................................ 63-98997
Apr. 30, 1988 [JP] Japan ................................ 63-108162

[51] Int. Cl.⁵ ..................... G11B 23/00; G11B 25/04; G06K 19/06
[52] U.S. Cl. ................. 369/271; 369/275.3; 369/124; 360/2; 235/493; 235/486
[58] Field of Search ............... 369/275.3, 270, 271, 369/124; 360/2, 131; 235/493, 486, 487

[56] References Cited

U.S. PATENT DOCUMENTS

| | | | |
|---|---|---|---|
| 3,430,966 | 3/1969 | Gregg | 369/270 |
| 3,808,404 | 4/1974 | Riggs | 235/488 |
| 4,864,113 | 9/1989 | Ogura | 369/124 |
| 4,916,687 | 4/1990 | Endo | 369/271 |

FOREIGN PATENT DOCUMENTS

370174 8/1988 Fed. Rep. of Germany ... 369/275.3

Primary Examiner—Roy N. Envall, Jr.
Assistant Examiner—Nabil Hindi

[57] ABSTRACT

An optical card including an optical storage medium and a single or a plurality of members made of a magnetic material which are incorporated with the optical card is set forth. A card holder for holding the optical card consists of a table for supporting the optical card and a single member or a plurality of members made of a magnetic material for attracting the optical card. An apparatus for recording and reproducing information on and from the optical card held by the card holder includes a light-irradiating unit for emitting light beams onto the optical storage medium of the optical card and a drive unit for relatively moving the card holder and the light-irradiating unit for tracking, with which the recording, reproducing, or erasing operation can be accurately carried out.

22 Claims, 6 Drawing Sheets

OPTICAL CARD, A CARD HOLDER AND AN APPARATUS FOR RECORDING, REPRODUCING AND ERASING INFORMATION ON AND FROM THE OPTICAL CARD

This application is a continuation, of application Ser. No. 07/340,756 filed on Apr. 20, 1989, now abandoned.

BACKGROUND OF THE INVENTION

1. Field of the invention

This invention relates to an optical card which serves as an optical memory, a card holder for holding the optical card, and an apparatus for recording, reproducing, and erasing information on and from the optical card.

2. Description of the prior art

In recent years, optical memories have come to public notice as high density and high capacity memories. As such optical memories, read-only type compact disks and video disks, add-on type optical disks, and rewritable type optical disks are known. The read-only type compact disks and video disks have already built up a wide market, and various research and development efforts have been made with respect to the add-on type and rewritable type optical disks,in order to enlarge the application of optical memories. In addition to these disk-shaped optical memories, card-shaped optical memories, which are called optical cards, have also attracted much attention as high capacity and portable memories.

Figure 12:
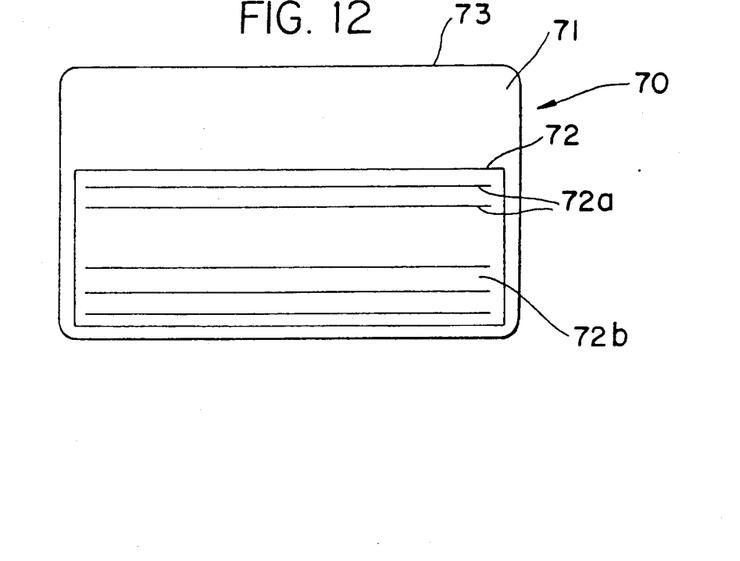
FIG. 12 is a plane view of a conventional optical card.

FIG. 12 shows a conventional optical card, which comprises a substrate 71 and an optical storage medium 72. The substrate 71 of the optical card 70 is constituted by a thin plate in the shape of a rectangular parallelepiped, and is made of a plastic material such as polycarbonate. The optical storage medium 72 is in the form of a sheet, so as to be disposed on and incorporated with the substrate 71. A plurality of guide tracks 72a are formed on the optical storage medium 72 so as to be parallel with one end face 73 in the direction of length of the substrate 71, resulting in the formation of tracks 72b between the guide tracks 72a. When the tracks 72b are irradiated with light beams moving along the guide tracks 72a, the recording, reproducing, or erasing operation of information is conducted. During these operations, the optical card 70 is usually driven together with the card holder in the direction parallel to the end face 73 of the substrate 71, as described below.

Figure 13:
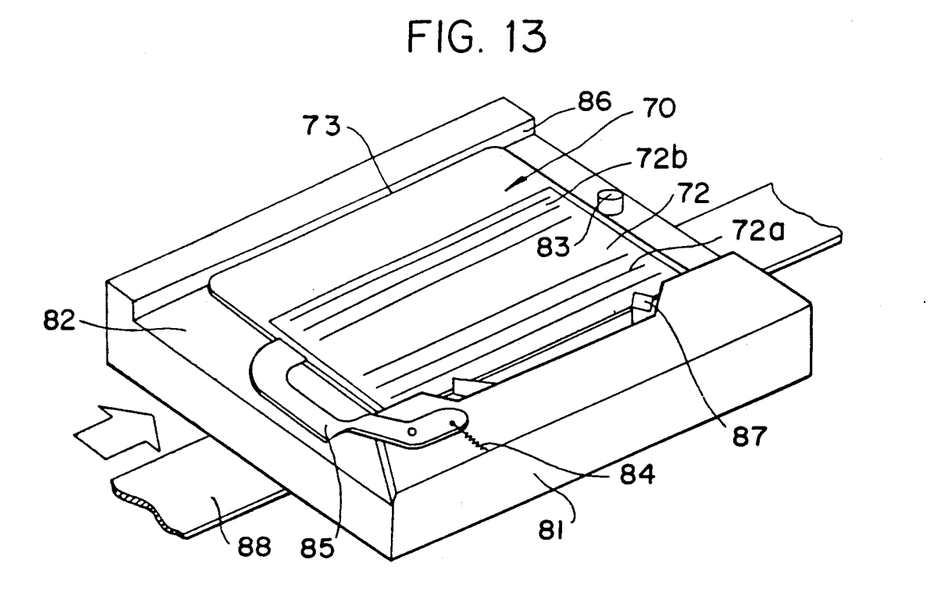
FIG. 13 is a perspective view of a card holder for holding the optical card of FIG. 12.

FIG. 13 shows a conventional card holder, which is used for holding the optical card 70 during the operations of recording, reproducing, or erasing information on and from the optical card. The card holder comprises a table 81 with a shallow concave portion 82 to be loaded with the optical card 70. One edge portion in the direction of width of the concave portion 82 is provided with a pin 83 and the other edge portion is provided with a movable lever 85 for pushing the optical card 70 against the pin 83 by force of a coiled spring 84. One inner side 86 defining the concave portion 82 functions as a guide face for guiding the optical card 70, and the other inner side face is provided with a flat spring 87 for pressing the optical card 70 against the inner side 86. When the conventional card holder is loaded with the optical card 70, the optical card 70 is guided along the inner face 86 of the concave portion 82 in the direction indicated by the arrow of FIG. 13, so that its end face 73 faces the inner side 86 of the concave portion 82. The optical card 70 is allowed to slide on the bottom face of the concave portion 82 while being pressed by the flat spring 87 against the inner side 86 of the concave portion 82, until the end face in the direction of width of the optical card 70 comes to the stopper 83. The optical card 70 is then pressed by the movable lever 85 against the stopper 83, so that it can be in a fixed position on the table 81 of the card holder with its end face 73 abutting on the inner side 86 of the concave portion 82. Thereafter, the card holder is disposed on a belt 88 as described below and driven in the direction parallel to the inner side 86, so that the recording, reproducing, or erasing operation of information on and from the optical card 70 is carried out.

However, with the conventional card holder of this type, the optical card 70 in the concave portion 82 is unavoidably subjected to the pressing forces which are parallel to the surface of the optical card 70, so that the optical card 70, which has the substrate 71 constituted by a plastic thin plate, is easily warped by the pressing forces, resulting in the lifting of the optical storage medium 72 off the surface of the table 81. When the tracks 72b of the optical storage medium 72 which are lifted off the surface of the table 81 are scanned with light beams, the tracks 72b are not kept within the depth of focus of light beams, so that the operation of recording, reproducing, or erasing information on and from the optical card 70 is conducted incompletely. Moreover, since light beams are usually converged on the surface of the tracks 72b after passing through the substrate 71, the depth at which light beams are focused varies due to the curved substrate 71 of the optical card 70, so that light beams with a fixed diameter cannot be obtained.

It also happens that an optical card 70 in which the end face 73 and the guide tracks 72a of the optical storage medium 72 are not exactly parallel with each other is unintentionally produced. When such an optical card 70 is moved together with the conventional card holder, the guide tracks 72a deviate from the desired routes, so that autotracking of light beams along the guide tracks 72a becomes inaccurate. Even when an optical card in which the end face 73 and the guide tracks 72a of the optical storage medium 72 are exactly parallel to each other is used, the end face 73 of the optical card 70, which is made of a plastic material, is eventually worn out in the course of frequent use because the end face 73 is repeatedly pressed against the inner face 86 of the conventional card holder whenever the operation of recording, reproducing, or erasing information on and from the optical card is conducted, resulting in an optical card 70 in which the end face 73 and the guide tracks 72a are not exactly parallel to each other any longer. Accordingly, autotracking of light beams, which is satisfactorily conducted at first, becomes inaccurate as the end face 73 becomes worn out in the course of frequent use, so that the operation of recording, reproducing, or erasing information on and from the optical card 70 is conducted only with inaccuracy.

SUMMARY OF THE INVENTION

The optical card of the invention, which overcomes the above-discussed and numerous other disadvantages and deficiencies of the prior art, comprises an optical storage medium and a single or a plurality of members made of a magnetic material which are incorporated with said optical card.

In a preferred embodiment, said member or members made of a magnetic material are permanent magnets.

In a preferred embodiment, said member or members made of a magnetic material are completely buried.

In a preferred embodiment, one end face of said member or each of said members made of a magnetic material is exposed to the outside.

The card holder of the invention, which overcomes the above-discussed and numerous other disadvantages and deficiencies of the prior art, comprises a table for supporting said optical card and a single member or a plurality of members made of a magnetic material for attracting said optical card comprising a member or members made of a magnetic material.

In a preferred embodiment, said member or members made of a magnetic material are permanent magnets.

In a preferred embodiment, said member or members made of a magnetic material are electromagnets.

In a preferred embodiment, said member made of a magnetic material is positioned to be in contact with one end face of an optical card.

In a preferred embodiment, said member or members made of a magnetic material are positioned to be in contact with the surface of said optical card.

In a preferred embodiment, said member or members made of a magnetic material have different polarities.

In a preferred embodiment, said members made of a magnetic material are concentrically positioned.

In a preferred embodiment, said table comprises a concave portion into which an optical card is put.

The apparatus for recording or reproducing information on and from the optical card of the invention which overcomes the above-discussed and numerous other disadvantages and deficiencies of the prior art, comprises a card holder which comprises a table for supporting said optical card and a single member or a plurality of members made of a magnetic material for attracting said optical card which comprises a single member or a plurality of members made of a magnetic material, a light-irradiating unit for emitting light beams onto an optical storage medium of said optical card, and a drive unit for relatively moving said card holder and said light-irradiating unit for tracking.

In a preferred embodiment, said light-irradiating unit is used for conducting at least one of the operations of recording, reproducing, and erasing information on and from said optical card.

A member or members of an optical card of the invention can be made of a magnetic material or can be magnets. The magnets are preferably permanent magnets. The member or members of an optical card are usually constituted by either a magnetic material or magnets, but it is also possible that a member or members of an optical card of the invention are constituted by both a magnetic material and magnets.

A member or members of a card holder of the invention are magnets when the member or members of the optical card to be held are made of a magnetic material. When the member or members of the optical card held by the card holder are magnets, the member or members of the card holder are constituted by either or both of a magnetic material and magnets. In this case, the polarity of each magnet of the card holder is different from that of the corresponding magnet of the optical card.

A member or members of a card holder to be used in an apparatus for recording and reproducing information on and from an optical card of the invention are constituted by the same magnetic material or magnets that are used in the above-mentioned card holder.

Thus, the invention described herein makes possible the objectives of (1) providing an optical card which is not easily warped when it is held by a card holder or carried about; (2) providing an optical card in which wear does not readily arise on one end face; (3) providing a card holder by which an optical card can be held without being warped; (4) providing a card holder with which one end face of an optical card is not worn out even after frequent use of the optical card; (5) providing an apparatus for recording and reproducing information on and from an optical disk with which an optical card is not warped when it is held by a card holder; (6) providing an apparatus for recording and reproducing information on and from an optical disk with which one end face of an optical card is not worn out even after frequent use of the optical card; and (7) providing an apparatus for recording and reproducing information on and from an optical card with which the recording, reproducing, or erasing operation can be accurately carried out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

This invention will be better understood and its numerous objects and advantages will become apparent to those skilled in the art by reference to the accompanying drawings which are given by way of illustration only, and thus are not limitative of the present invention, and wherein.

DESCRIPTION OF THE PREFERRED EMBODIMENTS

Figure 1:
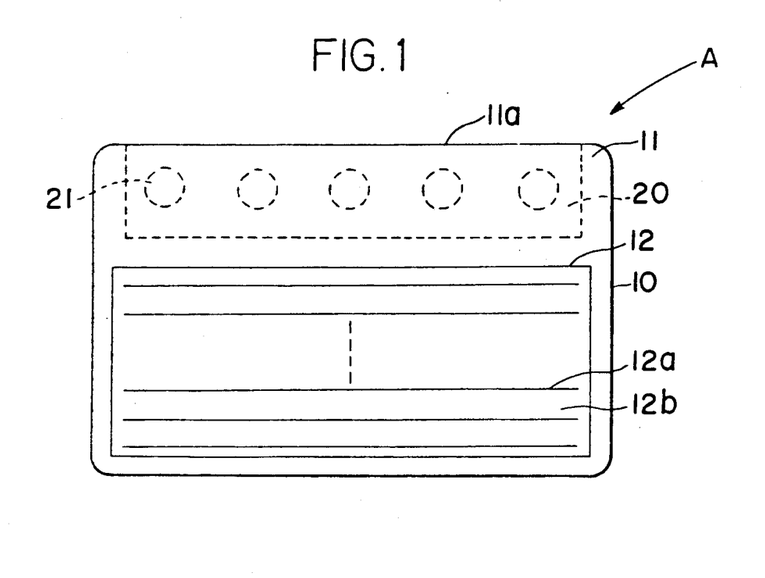
FIG. 1 is a plane view of an optical card of an embodiment of the present invention.
Figure 2:
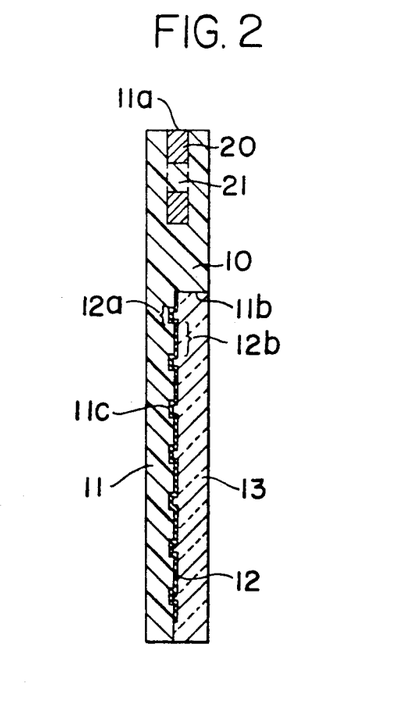
FIG. 2 is an enlarged cross sectional view of the optical card of FIG. 1.

FIG. 1 shows an optical card of the invention, which comprises a substrate 11 constituted by a thin plate in the shape of a rectangular parallelepiped, an optical storage medium 12, a protective layer 13 (FIG. 2) for protecting the optical storage medium 12 from the environment and a plate-shaped member 20 made of a magnetic material. The substrate 11 of the optical card A is made of a light-permeable plastic material such as polycarbonate, an acrylic resin, polystyrene, an epoxy resin, or the like. As shown in FIG. 2, the substrate 11 is formed with a concave portion 11b on which the optical storage medium 12 is disposed by lessening the thickness of the substrate 11 other than the portion in the vicinity of one end face 11a. The bottom face of the concave portion 11b is formed with a plurality of grooves 11c, which are parallel to the end face 11a in the direction of length of the optical card A. The optical storage medium 12 in the form of a thin film is disposed on the bottom face of the concave portion 11b with the plurality of grooves. The portions corresponding to the individual grooves 11c of the optical storage medium 12 serve as guide tracks 12a for guiding light beams and the remaining portions between the guide tracks 12a of the optical storage medium 12 serve as tracks 12b. On the optical storage medium 12, the protective layer 13 made of any of the light-permeable plastic materials mentioned above is disposed, so that the overall thickness of the optical card A becomes uniform.

The plate-shaped member 20 is disposed in the vicinity of the end face 11a of the optical card A. As a magnetic material for forming the plate 20, SUS430 stainless steel, nickel, cobalt, an alloy of nickel and cobalt, or the like can be listed. The plate 20 in the shape of a square parallelepiped is buried in the substrate 11 so that the top and back faces of the plate 20 are parallel with those of the substrate 11. The plate 20 is formed with a plurality of holes 21 which are aligned in the direction of length of the plate 20, so that the joining of the plate 20 with the substrate 11 is made secure. The end faces in the direction of width of the plate 20 are completely buried in the substrate 11. One end face in the direction of length of the plate 20 is flush with the remaining portion of the end face 11a of the substrate 11, and exposed to the outside.

The optical card A of this type is produced as follows:

First, the substrate 11 and the plate 20 are integrally formed. The position of the plate 20 in a mold is regulated so that one end face of the plate 20 which is flush with the remaining portion of the end face 11a of the substrate 11 is exactly parallel with the grooves 11c which are formed on the bottom face of the concave portion 11b of the substrate 11. When a plastic material for forming the substrate 11 is poured into the mold, the holes of the plate 20 are also filled with the plastic material, so that the plate 20 is securely joined with the substrate 11 after molding.

Then, the thin-film optical storage medium 12 and the the protective layer 13 are successively formed on the bottom face of the concave portion 11b of the substrate 11 in that order, resulting in the optical card A.

Figure 3:
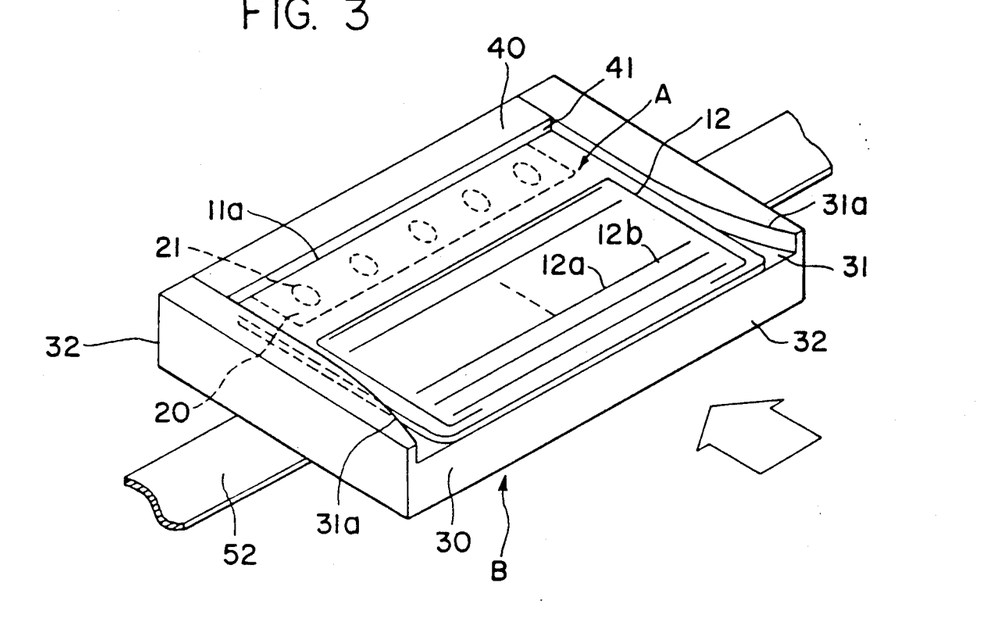
FIG. 3 is a perspective view illustrating the optical card of FIG. 1 and the principal portion of an apparatus for recording and reproducing information on and from the optical card of FIG. 1 of the invention.

The resulting optical card A is held by a card holder B as shown in FIG. 3, so that an operation of recording, reproducing, or erasing information on and from the optical card A can be conducted.

The card holder B comprises a table 30 in the shape of a flat parallelepiped and a member 40 constituted by a magnet for attracting the plate 20 of the optical card A. The table 30 is made of a non-magnetic material such as a plastic material, and is slightly larger than the optical card A in a plane view, so as to support the optical card A. The top face of the table 30 is formed with a concave portion 31, in which the optical card A is put. One end in the direction of length of the concave portion 31 is opened. The distance between the inner sides 31a in the direction of length of the concave portion 31 is slightly larger than the length of the optical card A, and is somewhat enlarged toward the open end of the concave portion 31.

The other end in the direction of length of the concave portion 31 is defined by the magnet 40 in the shape of a slat. The member 40 is constituted by a permanent magnet to attract the plate 21 made of a magnetic material of the optical card A. The magnet 40 is placed on one edge of the concave portion 31 between the inner sides 31a of the concave portion 31, so that its inner face 41 guides the end face 11a of the optical card A in loading the card holder B with the optical card A. The inner face 41 of the magnet 40 is parallel with both end faces 32 in the direction of length of the table 30.

Figure 4:
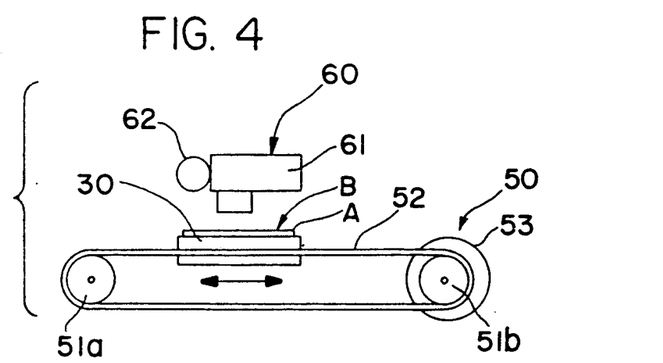
FIG. 4 is a side view diagrammatically illustrating the apparatus for recording and reproducing information on and from the optical card of FIG. 3.

As described below, the table 30 is disposed on a belt 52 and moved in the horizontal direction parallel to the inner face 41 of the magnet 40.

A card holder of this type holds the optical card A in a manner such as the follows:

The optical card A is guided by the bottom face and inner faces 31a of the concave portion 31, to be put into the concave portion 31 of the table 30 from the open end of the concave portion 31. The optical card A is guided so that the end face 11a of the optical card A faces the inner face 41 of the magnet 40. Since the distance between the inner sides 31a of the concave portion 31 is greater at the open end, the optical card A is easily introduced into the concave portion 31.

When the end face 11a of the optical card A comes to the inner face 41 of the magnet 40, the magnet 40 constituted by a permanent magnet attracts the plate 20 made of a magnetic material, so that the optical card A is in a fixed position on the bottom face of the concave portion 31 with its end face 11a entirely being in contact with the inner face 41 of the magnet 40. With the optical card A in the concave portion 31 of the card holder B, the guide tracks 12a of the optical storage medium 12 are in parallel to the inner side of the magnet 40 of the card holder B. Moreover, the optical card A is not warped on the table 30 of the card holder B, because there are no forces acting on the optical card A from outside. In this way, there is no danger of the optical card A lifting from the bottom face of the concave portion 31 of the table 30.

Furthermore, since the plate 20 made of a magnetic material is buried in the optical card A, the optical card A is more rigid than the conventional optical card, so that it is not easily warped even when some unforeseen forces act on the optical card A from outside during carriage or storage.

The end face of the plate 20, which mainly constitutes the end face 11a of the optical card A, prevents the end face 11a of the optical card A from being worn out, so that the guide tracks 12a of the optical storage medium 12 are still in parallel to the inner face 41 of the magnet 40 even after frequent use of the optical card A.

When the optical card A is ejected from the concave portion 31 toward the open end, a roller made of rubber is brought onto the top face of the optical card A from above, and then rotated by a drive unit such as a motor. When a counterforce which exceeds the attraction of the magnet 40 is exerted by the drive unit in order to slide the optical card A in the direction opposite of the magnet 40, the optical card A is easily ejected from the concave portion 31 of the card holder B.

The card holder B of this type is used to record or reproduce information on and from the optical card A in such a manner as follows:

An apparatus for recording and reproducing information on and from the optical card A comprises the above-mentioned card holder B for holding the optical card A and a drive unit 50 for moving the card holder B, as shown in FIG. 4. The drive unit 50 further comprises a pair of pulleys 51a and 51b, a belt 52 which is wound around the pair of pulleys 51a and 51b, and a drive motor 53 which is connected to the pulley 51b. The upper and lower intermediate portions of the belt 52 between the pulleys 51a and 51b make a reciprocating movement in a horizontal direction. By alternating the direction of rotation of the drive motor 53, the upper and lower portions of the belt 52 change the directions of movement accordingly. The card holder B is disposed on the upper portion of the belt 52 between the pulleys 51a and 51b, so that the card holder B also moves reciprocatingly in the horizontal direction in accordance with the movement of the upper portion of the belt 52. Above the card holder B, a light-irradiating means 60 for emitting light beams is provided. The means 60 comprises an optical head 61, which faces the route of the card holder B. The optical head 61 is horizontally moved in the direction at right angles to the route of the card holder B.

When the recording operation of information on the optical card A is conducted, the optical card A is put into the card holder B first, and then the position of the optical head 61 is regulated by a feed motor 62 so that the optical head 61 is directly above a desired track 12b of the optical storage medium 12. The card holder B is horizontally moved with the belt 52 in the direction parallel to its inner face 41 while the desired track 12b is being irradiated with light beams from the optical head 61. Light beams are converged on the surface of the desired track 12b by an auto-focusing means (not shown) while accurately following and scanning the desired track 12b along the guide tracks 12a of the optical storage medium 12 by the autotracking means. By changing the intensity of light beams depending on the type of information to be recorded, the operation of recording information on the desired track 12b is carried out.

As described above, the optical card A held by the card holder B is not warped, nor does the optical storage medium 12 lift from the bottom face of the concave portion 31, so that the track 12b is always kept within the depth of focus of light beams. Moreover, because the optical card A is not warped in the concave portion 31, the depth at which light beams are focused does not vary, resulting in light beams with a fixed diameter. Furthermore, because the end face 11a of the optical card A is not worn out, the guide tracks 12a and the inner side 41 of the magnet 40 of the card holder B remains exactly parallel to each other, which brings about accurate autotracking and an accurate recording operation of information on the optical card A.

When information is reproduced from the optical card A, a desired track 12b is scanned in a similar manner to that of a recording operation, but the intensity of light beams used at a reproducing operation is lower than the threshold level at which a recording operation is conducted. In this case also, the optical card A is not warped, and the guide tracks 12a and the end face 11a of the magnet 40 are exactly kept in parallel to each other, resulting in an accurate reproduction of information from the optical card A.

The optical card A also ensures an accurate information erasure.

The optical card A of the invention can be a read-only memory.

Figure 5:
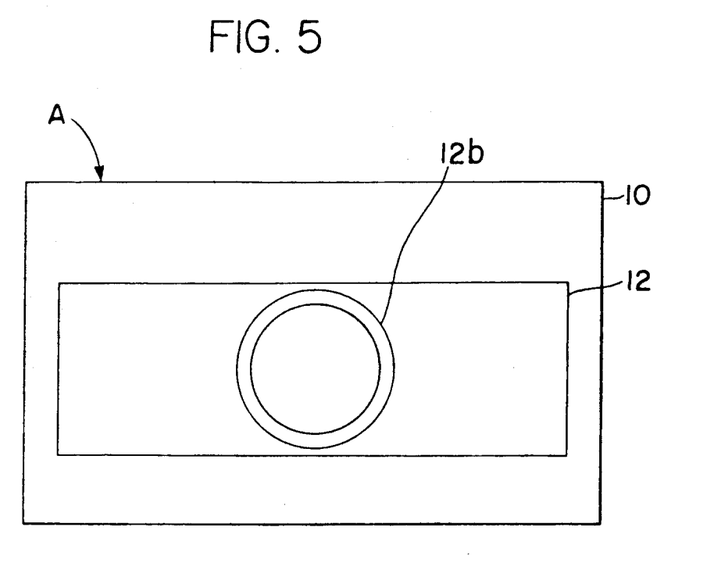
FIG. 5 is a plane view diagrammatically illustrating the structure of an optical card in which the optical storage medium is formed into a concentric circle.

The guide tracks 12a of the optical storage medium 12 can be formed into a concentric circle or a spiral, as shown in FIG. 5. With the optical card A having the guide tracks 12a in such a configuration, the operation of recording, reproducing, or erasing information is conducted by rotating the optical card A.

Figure 6:
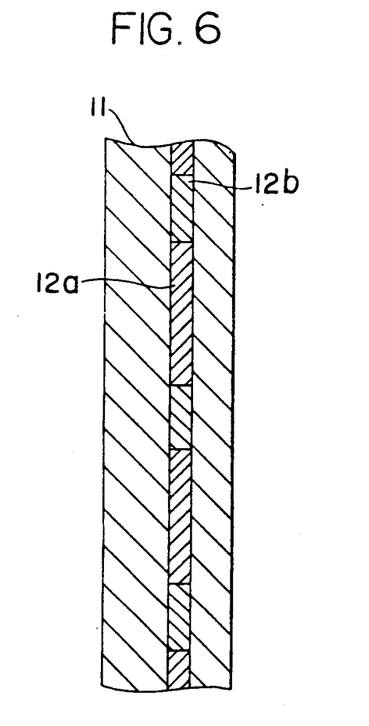
FIG. 6 is a cross sectional view illustrating guide tracks which are formed on the optical card of FIG. 5.

The guide tracks 12a of the optical storage medium 12 can be made of a material with an index of reflection different from that of the tracks 12a, as shown in FIG. 6.

The plate 20 which is incorporated with the optical card A to be attracted by the magnet 40 can be positioned at the edge portion in the direction of width of the optical card A.

Figure 7:
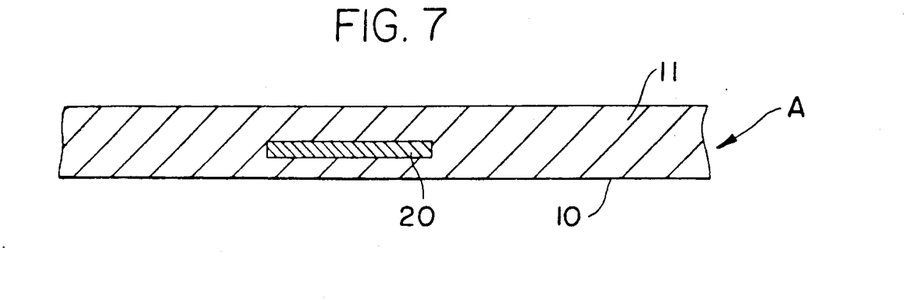
FIG. 7 is a cross sectional view illustrating the principal portion of another optical card of the invention.
Figure 8:
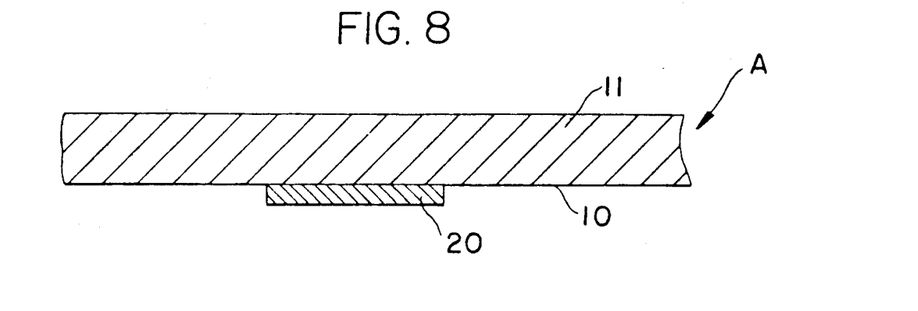
FIG. 8 is a cross sectional view illustrating the principal portion of still another optical card of the invention.
Figure 9A:
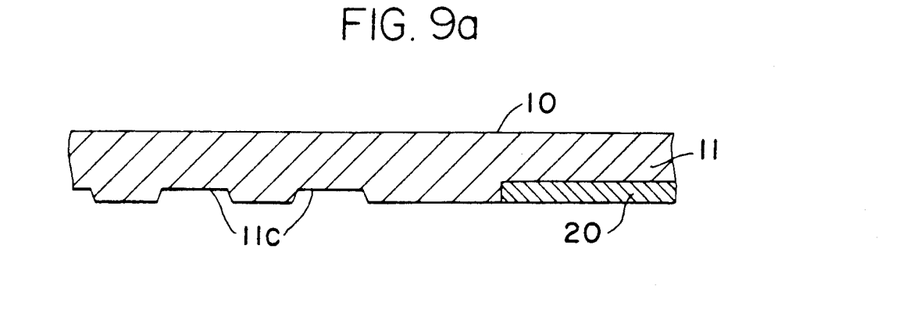
FIGS. 9a and 9b are views illustrating the processes of producing the optical card of FIG. 7.
Figure 9B:
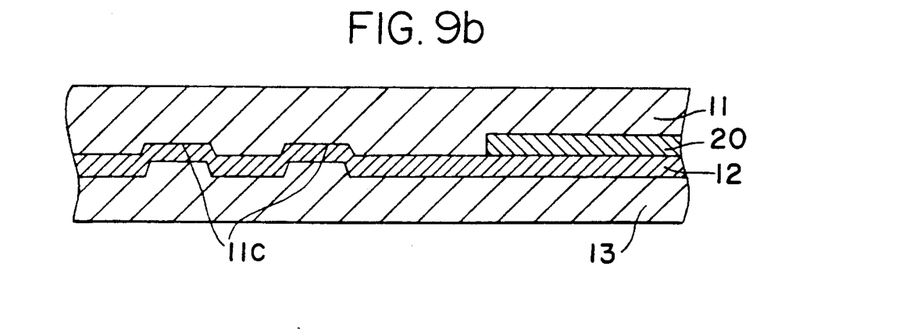

It is possible to bury the plate 20 completely in the substrate 11 of the optical card A or to fix the plate 20 to the surface of the substrate 11 of the optical card A, as shown in FIGS. 7 and 8.

It is also possible to provide the optical card A with a plurality of plates 20. The plates 20 can be permanent magnets. Instead of forming a magnetic material into the plate 20, it is possible to disperse a powdered magnetic material into the whole substrate 11 of the optical card A.

In order that the plate 20 is completely buried in the optical card A, the substrate 11 of the optical card A is formed by injection molding with the plate 20 which was previously inserted into the mold, and the optical storage medium 12 and the protective layer 13 is successively formed on the substrate 11 in that order.

As for the card holder B for holding the optical card A, the bottom face of the concave portion 31 can be provided with the second magnet 40, which attracts the optical card from below in addition to the first magnet 40 defining the concave portion 31 along inner face 41. With the second magnet 40, the optical card A is fixed to the concave portion 31 more securely.

Figure 10:
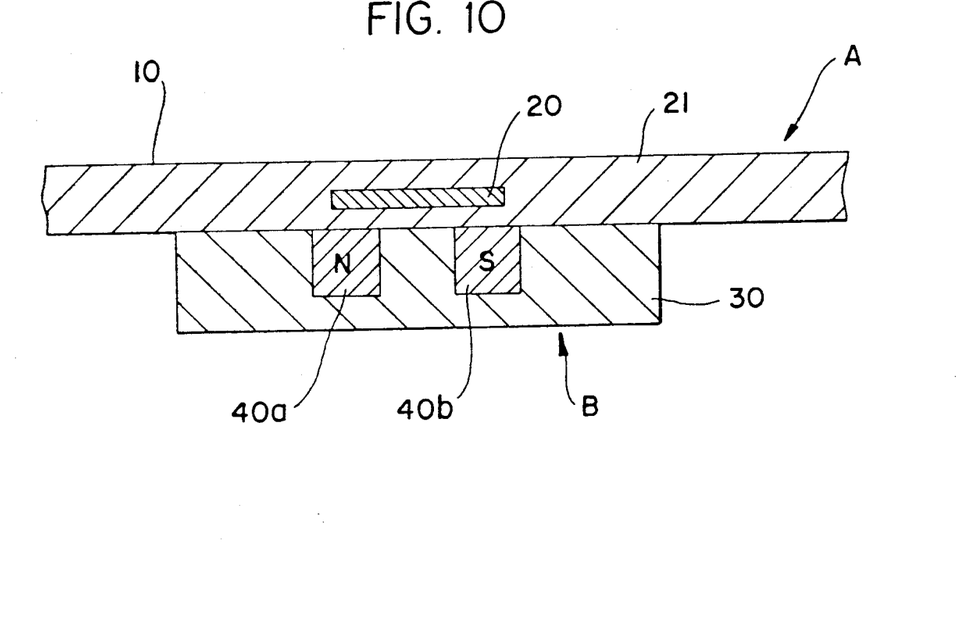
FIG. 10 is a cross sectional view illustrating a positional relation between the optical card of FIG. 7 and a card holder for holding an optical card of the invention.

As shown in FIG. 10, it is also possible to produce a card holder B which does not comprise the first magnet 40, but which comprises a pair of second magnets 40a and 40b. In this case, the pair of second magnets 40a and 40b are buried in the table 30 of the card holder B, so that the top faces of the magnets 40a and 40b, which are flush with the surface of the table 30, respectively constitute an N pole or an S pole.

Buried in the optical card A in such a manner that its top and back faces are in parallel with those of the optical card A, the plate 20 made of a magnetic material is attracted by the second magnets 40a and 40b. Consequently, the optical card A is in a fixed position of the table 30, where magnetic forces from the second magnets 40a and 40b are exerted on the plate 20.

The optical card A held by the card holder B of this type is not warped, and it is not necessary for its end face 11a to be kept in contact with the inner side 41 of the magnet 40 of the card holder B, for the position of the optical card A can be regulated only by force of magnetic attraction. Thus, even when the optical card A in which the end face 11a is somewhat inclined is produced, the tracking operation can be conducted without being effected by the inclination of the end face 11a. Moreover, even when the end face 11a is brought into contact with the inner side 41 by any chance, the contact of the end face 11a with the inner side 41 functions as just a supplementary factor in regulating the position of the optical card A on the table 30 of the card holder B, so that the wear of the end face 11a resulting from the contact with the inner side 41 can be reduced.

Figure 11:
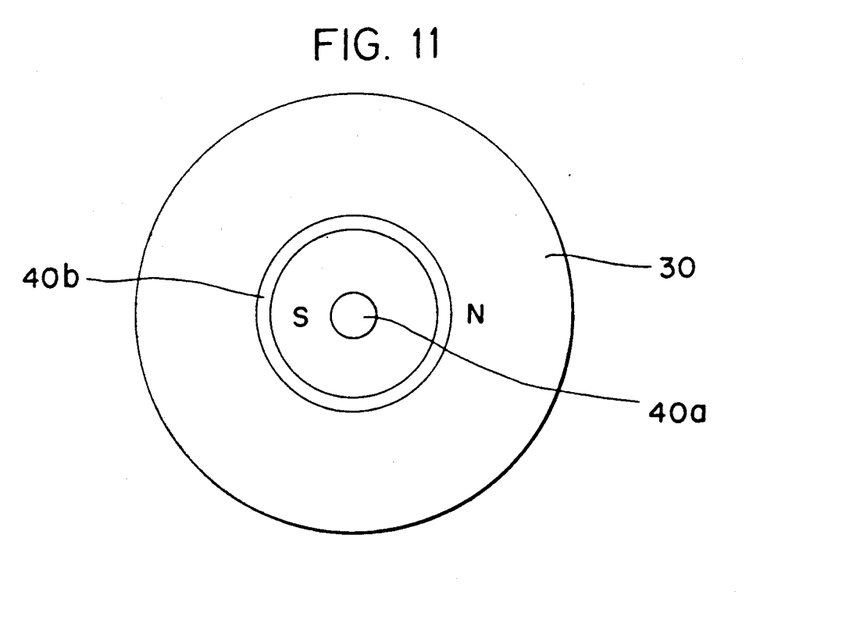
FIG. 11 is a plan view illustrating a modified embodiment of the card holder of FIG. 10.

As shown in FIG. 11, it is possible that one second magnet 40a is formed into a disk or a column while the second magnet 40b is formed into a circle, so that the circular second magnet 40b concentrically surrounds the disk-shaped or column-shaped second magnet 40a, resulting in the pair of second magnets 40a and 40b of the optical card A. With these second magnets 40a and 40b, the convergency of magnetic flux is improved, so that the position of the optical card A can be regulated more easily and more accurately.

When the plate 20 of the optical card A is a permanent magnet, it is possible to use a member 40 made of a magnetic material in the card holder B in place of the magnet 40. It is also possible to use an electromagnet in the card holder B in place of the magnet 40.

The number of the magnets 40 or the number of pairs of the magnets 40 to be installed in the optical card A can be determined in accordance with the number of plates 20 of the optical card A.

The card holder B can be used not only when information is recorded, reproduced, or erased on and from the optical card A, but when information is stored on the optical card A.

It is possible to produce an apparatus for recording and reproducing information on and from the optical card A in which the optical head 61, instead of the card holder B, is moved in the direction of tracking.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical card having a first edge comprising:
   an optical storage medium for storing information on the optical card, said optical storage medium being located at a predetermined position on the optical car; and
   magnetic edge positioning means, disposed along the first edge of the optical card, for magnetically attracting and aligning the first edge of the optical card conformally to a magnetic vertical face, thereby enabling secure positioning of said optical storage medium over an optical reader.

2. The optical card according to claim 1, wherein the magnetic edge positioning means is a permanent magnet of a polarity different from that of the magnetic vertical face.

3. The optical card according to claim 1 or 2, wherein said magnetic edge positioning means is completely buried.

4. The optical card according to claim 2, wherein one end face of said magnetic edge positioning means is exposed outside of the optical card along the first edge.

5. An optical recording and reproducing apparatus comprising:
   an optical card of rectangular shape, said optical card having an optical storage medium for storing information and a magnetic material medium in an end face thereof;
   card holder means including a table having a rectangular concave portion, including a top opening through which said optical card is inserted and a vertical face, the end face of said optical card contacting the vertical face of the concave portion of the table, said card holder means further comprising a magnet disposed within the vertical face of the concave portion of the table, for attracting the magnetic material medium of said optical card upon insertion of said optical card into the concave portion of the table to conformally secure said optical card in proper position therein;
   light irradiating means for emitting light beams onto the optical storage medium of said optical card; and
   drive means for moving the card holder means relative to the light irradiating means for tracking.

6. The apparatus for recording and reproducing information on and from an optical card according to claim 5, wherein light-irradiating means is used for conducting at least one operation of recording, reproducing, and erasing information on and from the optical card.

7. An optical recording and reproducing system comprising:
   an optical card having a storage medium for storing information and a magnetic material medium disposed within an end face thereof; and
   card holding means, for supporting said optical card during optical recording and reproducing, comprising a table with a concave portion having a top opening into which said optical card is insertable and a vertical face for conformally contacting said end face,
   said vertical face of said concave portion comprising a magnetic material member for attracting said magnetic material medium of said optical card to conformally secure said optical card in proper position within said concave portion of said table.

8. The optical recording and reproducing system of claim 7, wherein said magnetic material member is a magnet.

9. The optical recording and reproducing system of claim 8, wherein said magnetic material medium is a permanent magnet or different polarity than said magnetic material member.

10. The optical recording and reproducing system of claim 9, wherein said permanent magnet is an electromagnet.

11. The optical recording and reproducing system of claim 7, wherein said magnetic material medium comprises a substrate portion of said optical card dispersed with magnetic particles.

12. The optical recording and reproducing system of claim 7, wherein said magnetic material medium is entirely embedded within said optical card.

13. The optical recording and reproducing system of claim 7, wherein said magnetic material medium is embedded within said optical card with an edge portion exposed along said end face.

14. The optical recording and reproducing system of claim 7, wherein said magnetic member and magnetic material medium are concentric.

15. The optical recording and reproducing system of claim 7, wherein said card holding means comprises a further magnetic material member in a base portion of said table adjacent said vertical face for further attracting said magnetic material medium of said optical card.

16. The optical recording reproducing system of claim 7, wherein said optical card and said concave portion of said table are of rectangular shape.

17. A method of positioning an optical card in a card holder to facilitate reliable recording and reproducing comprising the steps of:
  embedding a magnetic material medium in an end face of the optical card;
  forming the card holder with a recess including a vertical magnetic edge surface; and
  inserting the optical card into the recess of the card holder with the end face in conformal contact with the vertical magnetic edge surface,
  the vertical magnetic edge surface attracting the magnetic material medium of the optical card to conformally secure the optical card in proper position within the recess of the card holder.

18. The method of positioning an optical card of claim 17, further comprising forming the vertical magnetic edge surface of a magnet.

19. The method of positioning an optical card of claim 18, further comprising embedding a permanent magnet, of a polarity different than the magnet of the vertical magnetic edge surface, as the magnetic material medium in the end face of the optical card.

20. The method of positioning an optical card of claim 17, further comprising embedding the magnetic material medium entirely within the optical card.

21. The method of positioning an optical card of claim 17, further comprising embedding the magnetic material medium within the optical card with a portion exposed along the end face.

22. The method of positioning an optical card of claim 17, further comprising forming the card holder with a rectangular recess wherein the optical card is of rectangular shape.

* * * * *